(12) United States Patent
Jain

(10) Patent No.: US 8,929,430 B2
(45) Date of Patent: Jan. 6, 2015

(54) ELECTRO-MAGNETIC INTERFERENCE REDUCTION FOR SWITCHED SIGNAL SYSTEMS

(75) Inventor: Kapil Jain, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 426 days.

(21) Appl. No.: 13/219,528

(22) Filed: Aug. 26, 2011

(65) Prior Publication Data

US 2012/0063552 A1     Mar. 15, 2012

Related U.S. Application Data

(60) Provisional application No. 61/381,821, filed on Sep. 10, 2010.

(51) Int. Cl.
*H03K 7/08* (2006.01)
*H04B 15/06* (2006.01)

(52) U.S. Cl.
CPC .......... *H04B 15/06* (2013.01); *H04B 2215/064* (2013.01); *H04B 2215/067* (2013.01)
USPC ............ 375/238; 375/239; 375/253; 375/346

(58) Field of Classification Search
USPC ........................................................ 375/346
See application file for complete search history.

(56) References Cited

U.S. PATENT DOCUMENTS

| | | | |
|---|---|---|---|
| 5,323,096 A * | 6/1994 | Nakai ........................... | 318/603 |
| 6,204,649 B1 | 3/2001 | Roman | |
| 6,998,894 B2 * | 2/2006 | Lee et al. ...................... | 327/172 |
| 7,315,155 B2 | 1/2008 | Takeuchi | |
| 7,317,758 B2 | 1/2008 | Alrutz et al. | |
| 7,471,529 B2 * | 12/2008 | Jin et al. .......................... | 363/87 |
| 8,085,106 B2 * | 12/2011 | Huda et al. .................... | 332/123 |
| 2001/0054997 A1 * | 12/2001 | Fujioka et al. .................. | 345/87 |
| 2006/0262843 A1 * | 11/2006 | Kim et al. ...................... | 375/238 |
| 2009/0191833 A1 | 7/2009 | Kaczman et al. | |
| 2010/0156527 A1 | 6/2010 | Midya et al. | |

OTHER PUBLICATIONS

PCT International Search Report, Application No. PCT/US11/049451, Dec. 19, 2011.

* cited by examiner

*Primary Examiner* — Lihong Yu

(57) ABSTRACT

In one embodiment, a method receives a pulse width modulation signal. A value that is a function of the pulse width modulation signal is determined. The value is used to modulate a switching frequency of the pulse width modulation signal to generate a modulated pulse width modulation signal. The applied value reduces electro-magnetic interference from tones in the modulated pulse width modulation signal.

20 Claims, 9 Drawing Sheets

| | SNR dB (702) | A-weighted SNR dB (704) | THD+N dB (706) | A-weighted THD+N dB (708) | Peak FCC Band1 dB (710) | Peak FCC Band2 dB (712) | Attenuation in FCC Band1 dB (714) | Attenuation in FCC Band2 dB (716) | Degradation of SNR dB (718) | Degradation of THD+N dB (720) |
|---|---|---|---|---|---|---|---|---|---|---|
| No SS | 121.956 | 125.103 | -116.259 | -118.949 | -41.517 | -54.426 | | | | |
| SS using 1st derivative | 121.956 | 125.101 | -40.201 | -39.118 | -44.351 | -63.145 | 2.834 | 8.719 | 0 | 76.058 |
| SS using 2nd derivative | 121.956 | 125.094 | -78.902 | -77.819 | -45.41 | -77.869 | 3.893 | 23.443 | 0 | 37.357 |
| SS using 3rd derivative | 121.925 | 125.080 | -113.853 | -114.547 | -42.086 | -78.394 | 0.569 | 23.968 | 0.031 | 2.406 |
| SS using 4th derivative | 121.856 | 125.043 | -116.209 | -118.946 | -43.855 | -77.469 | 2.338 | 23.043 | 0.1 | 0.05 |
| SS using 5th derivative | 121.655 | 124.949 | -116.080 | -118.878 | -50.159 | -78.369 | 8.642 | 23.943 | 0.301 | 0.179 |
| SS using 6th derivative | 120.869 | 124.597 | -115.589 | -118.675 | -61.701 | -77.922 | 20.184 | 23.496 | 1.087 | 0.67 |
| SS using 7th derivative | 117.325 | 122.712 | -112.753 | -117.243 | -62.425 | -77.303 | 20.908 | 22.877 | 4.631 | 3.506 |
| SS using 8th derivative | 104.407 | 110.194 | -103.283 | -109.028 | -66.697 | -81.840 | 25.18 | 27.414 | 17.549 | 12.976 |
| SS using 9th derivative | 60.865 | 62.603 | -59.627 | -61.229 | -66.082 | -81.737 | 24.565 | 27.311 | 61.091 | 56.632 |
| SS using 10th derivative | 37.183 | 38.947 | -35.328 | -36.342 | -65.716 | -80.696 | 24.199 | 26.27 | 84.773 | 80.931 |

FIG. 7

ELECTRO-MAGNETIC INTERFERENCE REDUCTION FOR SWITCHED SIGNAL SYSTEMS

CROSS REFERENCE TO RELATED APPLICATIONS

The present disclosure claims priority to U.S. Provisional App. No. 61/381,821 for "Electro-magnetic Interference Reduction Methodology for Class-D Audio Amplifiers" filed Sep. 10, 2010, which is incorporated herein by reference in its entirety for all purposes.

BACKGROUND

Particular embodiments generally relate to electro-magnetic interference reduction systems.

Unless otherwise indicated herein, the approaches described in this section are not prior art to the claims in this application and are not admitted to be prior art by inclusion in this section.

An audio amplifier may be used in a portable application because of the audio amplifier's high efficiency of power delivery to a load, such as a headphone and/or speakers. However, class-D audio amplifiers may produce electro-magnetic interference (EMI). A class-D amplifier generates a pulse-width modulation (PWM) signal that is based on an input audio signal. The PWM switching frequency is in the range of several hundreds of Kilohertz (KHz). The audio amplifier may be used in a portable device, such as a cellular phone, tablet, or smart phone. The PWM carrier frequency and/or its harmonics may reside in a radio frequency range and causes electro-magnetic interference to radio frequency signals in the portable device. Different methods have been used to reduce electro-magnetic interference. For example, inductor capacitor (LC) filters, shielding, ferrite beads, and spread spectrum modulation have been used.

Inductor-Capacitor (LC) filters may be used at the amplifier output. However, the LC filters are large and expensive, which increases the system cost.

Shielding may be used to cover the EMI emissions. For example, printed circuit board (PCB) traces that carry high frequency signals may be routed between ground planes, which partially cover the electro-magnetic signals with ground conductive shields. However, the shields increase system weight, cost, and use additional area on the PCB.

Ferrite beads are passive electronic components that are used to suppress high frequency noise. Ferrite beads act as a radio frequency (RF) choke and placing the ferrite beads in series with the load (e.g., speakers) close to the audio amplifier may attenuate high frequency signal components and reduce EMI. However, the ferrite beads are effective over a narrow frequency range and may not provide enough attenuation over the output noise bandwidth.

Spread spectrum modulation may be used where the switching frequency of the PWM signal is fluctuated around a center switching frequency. This spreads the energy centered in the switching frequency and its harmonics to neighboring frequencies. Various frequency fluctuations exist, such as random and chaotic modulation. However, these methods do not attenuate the EMI significantly and also degrade the audio in-band noise floor (e.g., degrade the signal to noise ratio (SNR)).

A permissible level of conductive and radiated EMI by any device is regulated by a number of governing bodies throughout the world to ensure electro-magnetic compatibility (EMC) of all electronic equipment. The Federal Communications Commission (FCC) includes specifications for radiated EMI for two different categories of devices, Class A and Class B devices. Class A devices are categorized as business/industrial/commercial use devices, whereas Class B devices are categorized as residential use devices. Table 1 shows an example of the limits for Class A and Class B devices.

TABLE 1

| | Frequency Range MHz | Radiated Emissions Limits for ClassA (dB uV/meter @ 10 meters) | Radiated Emissions Limits for ClassB (dB uV/meter @ 3 meters) |
| --- | --- | --- | --- |
| FCC Radiated EMI Limits for Class A and Class B products | [30 88] | 39.1 | 40 |
| | [88 216] | 43.5 | 43.5 |
| | [216 960] | 46.4 | 46.0 |
| | [960 10000] | 49.5 | 54.0 |

Also, FIG. 1 shows the limits for radiated EMI for the class B category.

A class-D amplifier uses a fixed frequency PWM signal. Large tones are observed at the PWM carrier frequency and its harmonics. The tones are illustrated in FIGS. 2, 3, and 4. The following simulation set-up and results are used to show the tones that may be observed:

Simulation Setup—

| | |
| --- | --- |
| Input signal sample rate | 48 KHz |
| Signal fundamental frequency | 937.5 Hz |
| Supply Voltage | 1.8 v |
| PWM switching frequency | 5.080320092962877e+05 Hz |
| PLL Clock | 1.625702400000000e+09 Hz |
| RBW | 104 Hz |

Results—

| | |
| --- | --- |
| SNR | 121.9556 dB |
| THD + N | −116.2588 dB (0.00015%) |
| Min attenuation in FCC band1 30 MHz-300 MHz | 41.517 dB |
| Min attenuation in FCC band2 300 MHz-1 GHz | 54.426 dB |

In FIG. 2, a graph 202 shows the PWM output. Also, a graph 204 shows the PWM output around the PWM frequency. A graph 206 shows tones in a FCC band1 (30 MHz-300 MHz) and a graph 208 shows tones in a FCC band2 (300 MHz-1 GHz). Tones near the frequency 30 MHz are as high as −41.5 dB and tones near the frequency 300 MHz are around −54.4 dB. Signal to Noise ratio (SNR) is 121.96 dB and total harmonic distortion+noise (THD+N) is −116.26.

Referring to FIG. 3, a graph 302 shows tones in a start region of FCC band1, and a graph 304 shows tones in a start region of FCC band2. As shown, the tones in FCC band1 are around −41.5 dB and the tones in FCC band2 are around −54.4 dB. FIG. 4 shows tones around the end-region of FCC band1 and band2. In a graph 402, the tones near the frequency 300 MHz are around −55 dB and in a graph 404, the tones near the frequency 1 GHz are around −65 dB. The PWM tones observed in FCC band1 and band2 are an interference source in the RF domain.

SUMMARY

In one embodiment, a method receives a pulse width modulation signal. A value that is a function of the pulse width modulation signal is determined. The value is used to modulate a switching frequency of the pulse width modulation signal to generate a modulated pulse width modulation signal. The applied value reduces electro-magnetic interference from tones in the modulated pulse width modulation signal.

In one embodiment, the function of the pulse width modulation signal is an Nth derivative of the fixed frequency pulse width modulation signal, where N=1, n.

In one embodiment, the Nth derivative is a $6^{th}$ derivative of the fixed frequency pulse width modulation signal.

In one embodiment, a frequency of the pulse width modulation signal is a ratio that is based on a number of phase lock loop (PLL) cycles in each PWM clock cycle.

In one embodiment, an apparatus includes: circuitry configured to receive a pulse width modulation signal; circuitry configured to determine a value that is a function of the pulse width modulation signal; and circuitry configured to apply the value to modulate a switching frequency of the pulse width modulation signal to generate a modulated pulse width modulation signal, wherein the applied value reduces electro-magnetic interference from tones in the modulated pulse width modulation signal.

In one embodiment, a system includes a pulse width modulation (PWM) generation block comprising logic configured to: receive an input signal; determine crossing points of the input signal to a waveform; and output the fixed frequency pulse width modulation signal based on the crossing points.

The following detailed description and accompanying drawings provide a more detailed understanding of the nature and advantages of the present invention.

BRIEF DESCRIPTION OF THE DRAWINGS

FIG. 7 shows a table of results that are used to determine which Nth derivative to use in the modulation according to one embodiment.

DETAILED DESCRIPTION

Described herein are techniques for an EMI reduction system. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
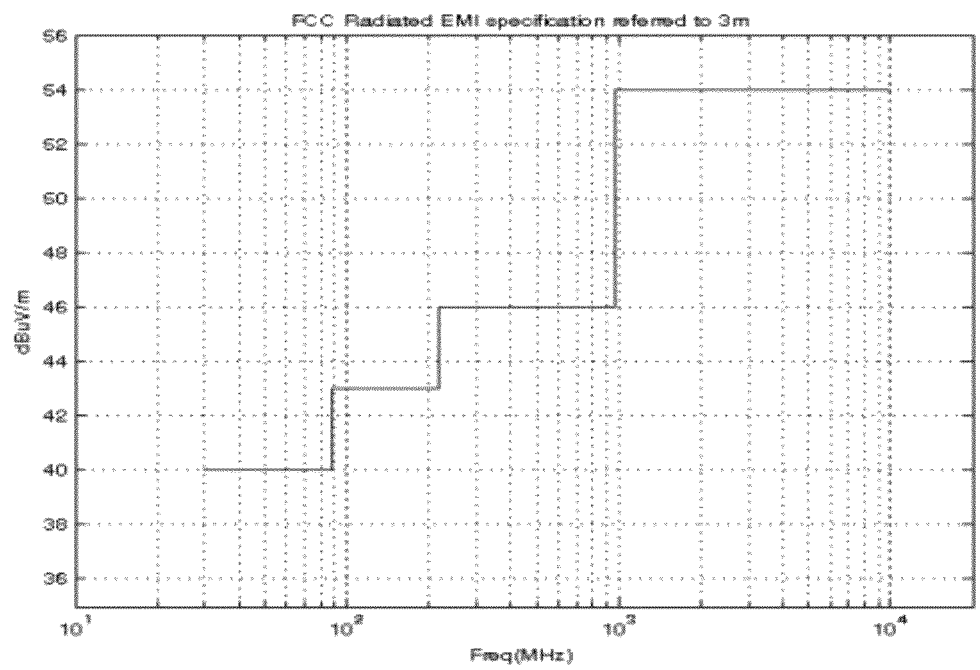
FIG. 1 shows the limits for radiated EMI for the class B category.
Figure 2:
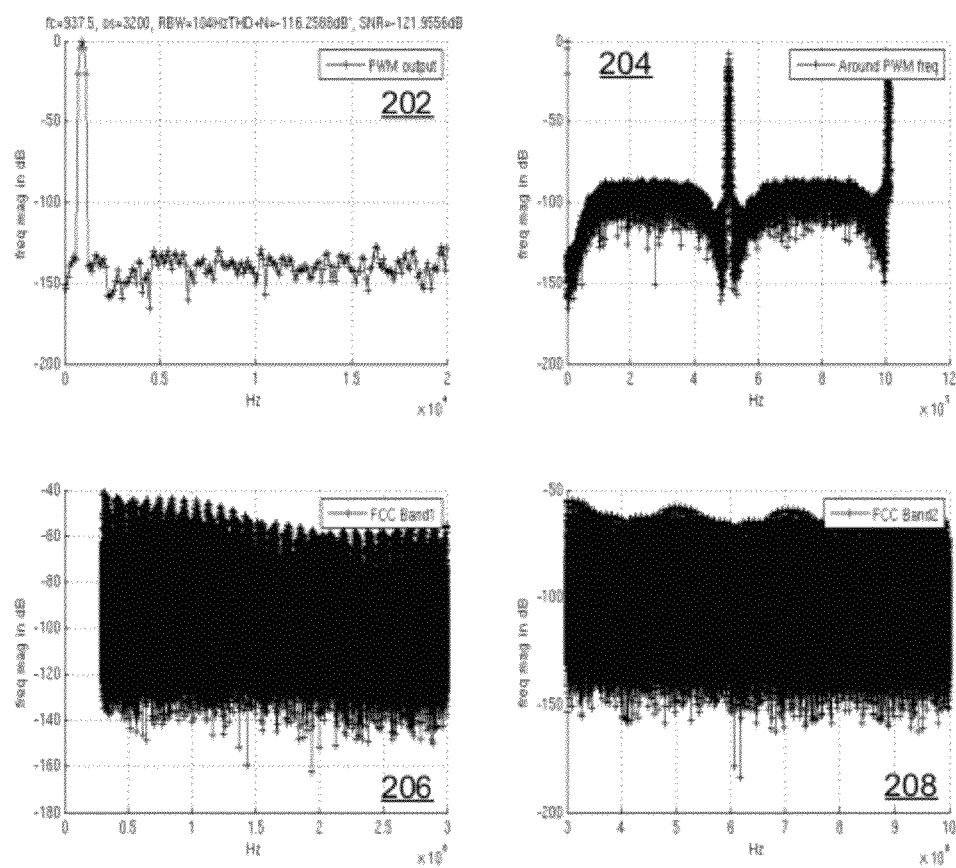
FIG. 2 depicts a graph showing the PWM output and a graph showing the PWM output around the PWM frequency.
Figure 3:
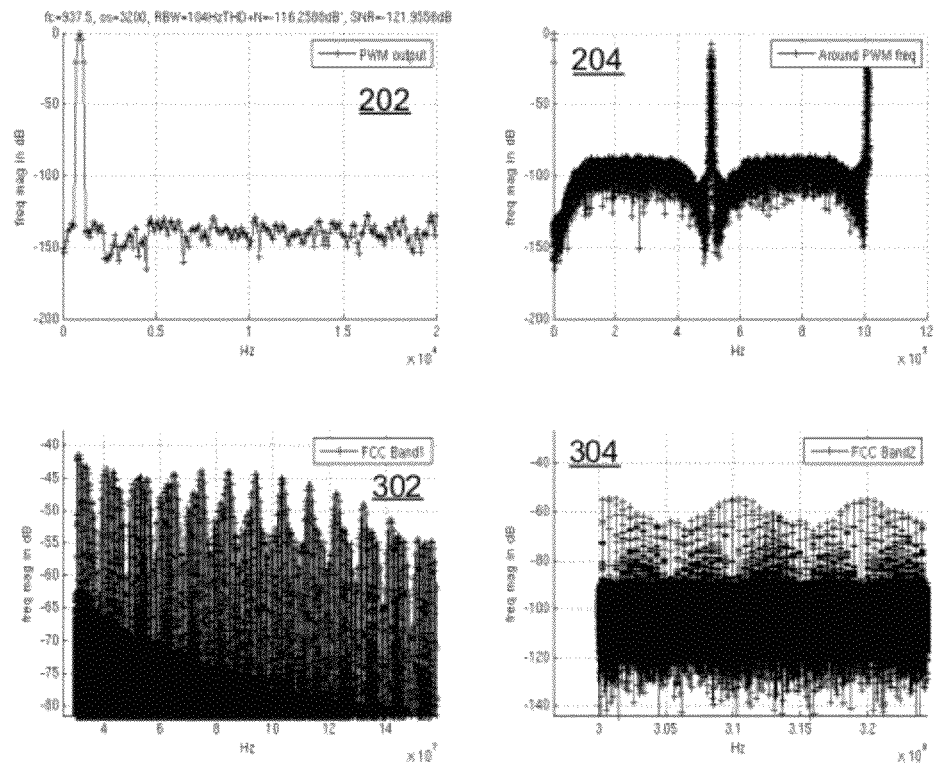
FIG. 3 depicts a graph showing tones in a start region of FCC band1 and a graph showing tones in a start region of FCC band2.
Figure 4:
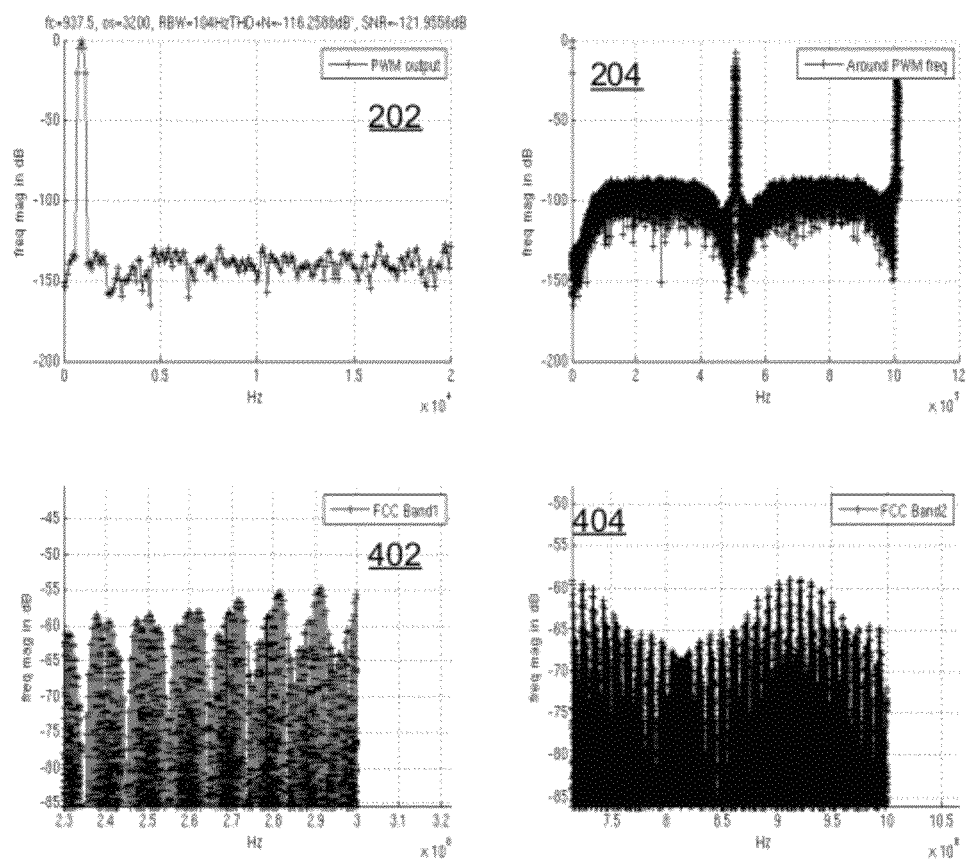
FIG. 4 shows tones around the end-region of FCC band1 and band2.
Figure 5:
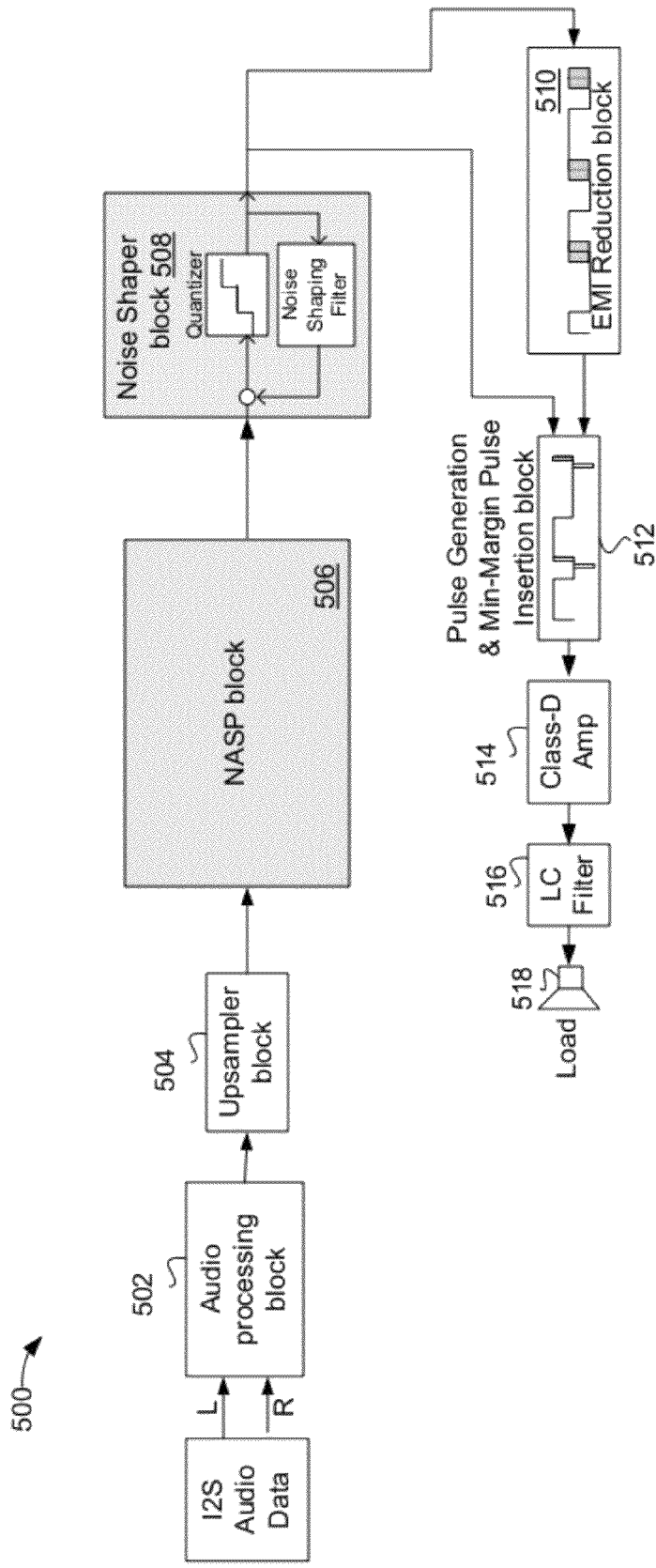
FIG. 5 depicts an example of a system for a class-D audio amplifier according to one embodiment.

Particular embodiments modulate a switching frequency of a pulse width modulation (PWM) signal to spread the energy that is centered in the PWM switching frequency's harmonics while preserving signal-to-noise ratio (SNR) and total harmonic distortion (THD) plus noise (N) performance. FIG. 5 depicts an example of a system 500 for a class-D audio amplifier according to one embodiment. Different implementations of the class-D amplifier may also be used, such as the audio post processing and PWM signal generation may differ. Although a class-D audio amplifier is described, the EMI reduction scheme described may be used in other systems, such as spread spectrum clock generators, motor drivers, switch mode power supplies, or other switched signal systems. In this case, the EMI reduction scheme may not be used in an amplifier system. For example, EMI reduction block 510 may generally receive a PWM signal and output a modulated PWM signal. These systems may be included in products, such as computers, printers, audio systems, digital audio players, cellular phones, and other products.

Audio data is received at an audio processing block 502. The audio data may be in an I2S format also known as inter-IC sound or integrated inter-chip sound. Data other than audio data may also be received, such as video data. Audio processing block 502 performs audio post processing. Other audio processing may also be performed. An up-sampler 504 may increase the sampling rate of the audio data. For example, up sampling may be performed. A natural sampling process (NASP) block 506 performs cross-point detection of the audio data to generate a PWM signal. The PWM signal has a fixed switching frequency. A noise shaper 508 shapes the PWM signal using a quantizer and noise-shaping filter. A person of skill in the art will appreciate the operations of audio processing block 502, PWM signal generation block 506, and noise shaper 508 according to the teachings and disclosure herein.

Particular embodiments include an EMI reduction block 510 that varies the period of a PWM switching frequency to reduce EMI and also limit SNR degradation. EMI reduction block 510 receives the PWM signal and outputs a PWM signal that has a modulated switching frequency. This process will be described in more detail below.

A min-margin block 512 performs pulse generation and min-margin pulse insertion. This inserts minimum and margin pulses into the modulated PWM signal. A class-D amplifier 114 amplifies the PWM signal. Although a class-D amplifier is described, other amplifiers that receive PWM signals may be used. An LC-filter 516 filters out high frequency noise. A load 518 then outputs the audio data. Load 518 may include loud speakers or headphones.

The PWM switching frequency is varied such that a rising edge in each PWM frame (e.g., one period) does not occur at a constant interval, i.e., the location of the first rising edge varies from frame to frame. In one example, an oversample (OS) Ratio is varied from frame to frame. The OS Ratio may be defined as:

$$OS \text{ Ratio} =$$
$$\text{phase lock loop } (PLL) \text{ clock frequency}/PWM \text{ switching frequency} =$$
$$\text{Number of } PLL \text{ clock cycles in each } PWM \text{ clock cycle.}$$

In one embodiment, the PLL is used by system 500 in modulating/demodulating radio frequency signals. The OS ratio is used to quantify a frequency of a period of the PWM signal. Other ratios may also be used, such as a comparison of the PWM switching frequency to another clock frequency. Additionally, the OS ratio may not be used.

In a conventional fixed frequency mode, the OS Ratio from one PWM frame to the next is constant. However, using EMI reduction block 510, the OS Ratio varies from frame to frame. For example, the OS Ratio may be lower than the fixed frequency value in frames and also higher in other frames. Also, the OS Ratio may be equal to the fixed frequency OS Ratio value in some frames. Also, the variation may not always be applied. For example, even though the OS ratio may not be equal to the fixed frequency, the frequency of the PWM may not be varied. For example, the variation may be applied every other clock cycle. The variation in the OS Ratio value from frame to frame may manifest itself as the PWM switching frequency variation. Although a fixed frequency is described, the PWM signal input into EMI reduction block 510 may have a variable frequency. The variable frequency is then varied using the OS ratio.

The OS Ratio is varied based on a function of the input signal to EMI reduction block 510. As described above, the input signal may be a PWM signal determined from the audio signal. In one embodiment, the OS Ratio is varied from frame to frame based on an Nth order derivative of the input signal to EMI reduction block 510. The use of a derivative of the input signal is based on an observation that using the derivative is likely to manifest itself as harmonic distortion in an audio baseband rather than signal-to-noise ratio degradation. In one example, the harmonic distortion due to an analog class-D amplifier is, at best, −100 dB. Thus, any harmonic distortion introduced by EMI reduction block 510 below −100 dB does not degrade the overall system performance. This is because the noise introduced by the derivative of the input signal is less than the noise that is introduced by the analog class-D amplifier.

The modulated OS Ratio is equal to:

Modulated OS Ratio=fixed frequency OS Ratio minus Nth derivative.

The calculation of derivatives of the input signal may be performed as follows:

$1^{st}$ derivative at index $k$=NS(No modulation) output at index $k$−NS output at index($k$−1);

$2^{nd}$ derivative at index $k$=$1^{st}$ derivative at index $k$−$1^{st}$ derivative at index($k$−1);

$3^{rd}$ derivative at index $k$=$2^{nd}$ derivative at index $k$−$2^{nd}$ derivative at index($k$−1);

. . .

$6^{th}$ derivative at index $k$=$5^{th}$ derivative at index $k$−$5^{th}$ derivative at index($k$−1); and so on.

Particular embodiments may use any Nth order signal derivative, where n is >1. However, selection criteria may be used to determine the optimal order N derivative. In one example, the highest FCC band1 and band2 attenuation with the minimal signal-to-noise (SNR) ratio degradation and minimal total harmonic distortion plus noise degradation (THD+N) may be used. This criterion is defined as: [highest FCC band1 and band2 attenuation] with [minimal SNR degradation] and [minimal THD+N degradation]. The derivative to use may be determined automatically by EMI reduction block 510 or be set.

Figure 6:
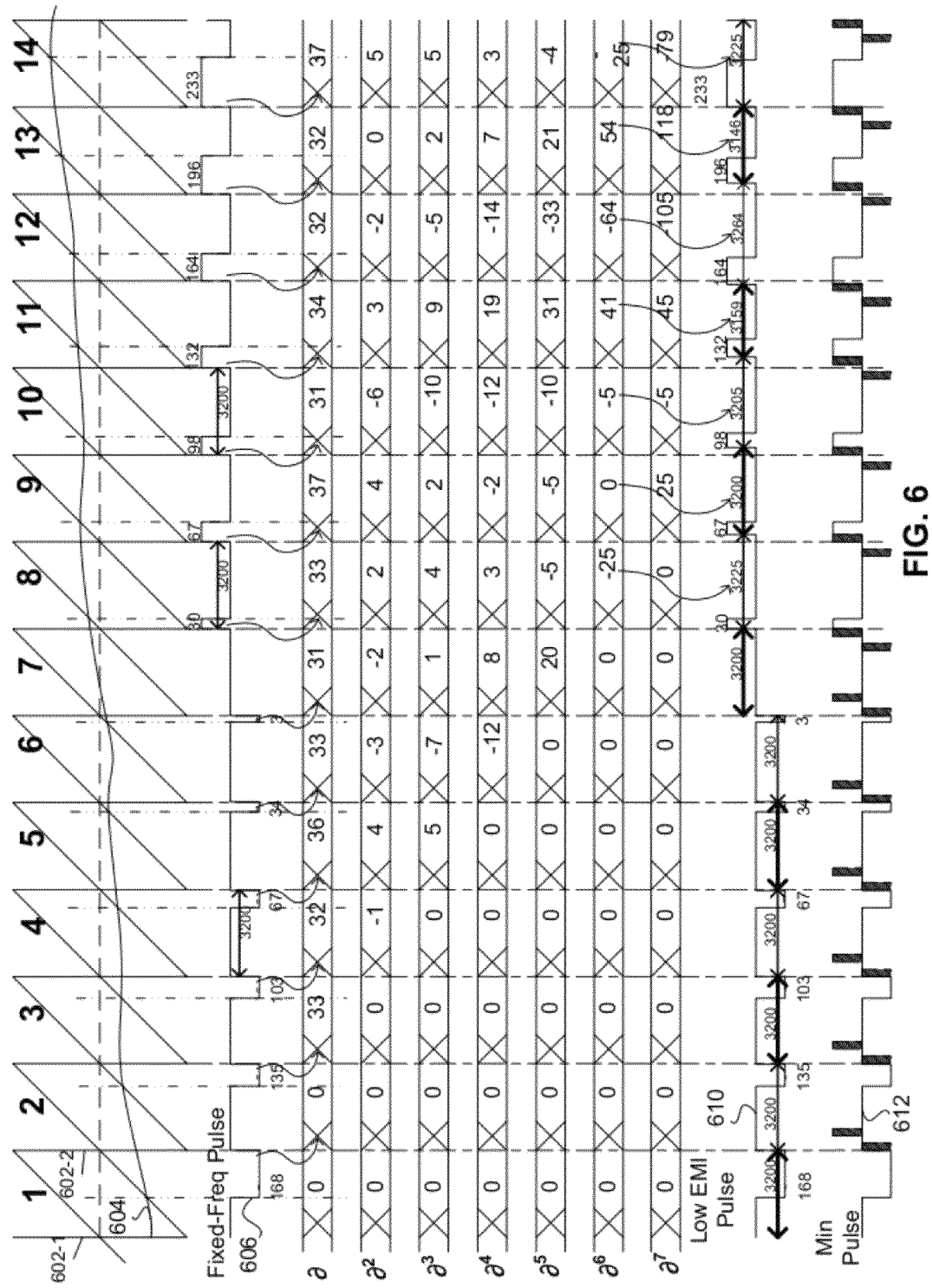
FIG. 6 shows an example of performing the EMI reduction according to one embodiment.

FIG. 6 shows an example of performing the EMI reduction according to one embodiment. In FIG. 6, PWM frames are labeled as 1, 2, 3, . . . , 14. Saw tooth waveforms 602-1 and 602-2 are used to determine a crossing point of an audio signal 604 in each frame. Other waveforms, such as a triangular waveform, may also be used. Audio signal 604 may be the signal output by upsampler 504. The crossing point of audio signal 604 with one of saw tooth waveforms 602-1 and 602-2 is used to determine the pulse size for a fixed frequency PWM signal 606, which is a PWM signal of a fixed frequency that is output from PWM signal generation block 508. For example, fixed frequency PWM signal (fixed freq pulse) 606 transitions from a low to high state when audio signal 604 crosses saw tooth waveform 602 below a median level or from a high to low state when audio signal 604 crosses saw tooth waveform 602 above the median level. The OS Ratio is 3200 where the OS Ratio equals the number of PLL clock cycles in each PWM clock cycle. The OS Ratio is fixed for fixed frequency PWM signal 606.

N number of derivatives (δ) of the fixed frequency PWM signal 606 are shown. The derivative for a frame is calculated as described above. For example, the $6^{th}$ derivative for the $8^{th}$ frame (−25) is the $5^{th}$ derivative of the $8^{th}$ frame (−5)—the $5^{th}$ derivative of the $7^{th}$ frame (−20). This results in a $6^{th}$ derivative of −5−−20=−25. A table 2 shows a summary of derivatives and modulated OS ratio for the first to fourteenth frames for the $6^{th}$ derivative:

TABLE 2

| Frame No. | $\delta^6$ | Modulated OS Ratio |
|---|---|---|
| 1-7 | 0 | 3200 |
| 8 | −25 | 3225 |
| 9 | 0 | 3200 |
| 10 | −5 | 3205 |
| 11 | 41 | 3159 |
| 12 | −64 | 3264 |
| 13 | 54 | 3146 |
| 14 | −25 | 3225 |

A modulated PWM signal (low EMI pulse) 610 is a PWM signal output by EMI reduction block 510. The frequency of modulated PWM signal 610 varies based on the Nth derivative that is selected. In one example, the sixth derivative may be used to modulate the PWM switching frequency. As shown, until the first to seventh frames, the sixth derivative is zero. Thus, the period of modulated PWM signal 610 is 3200. However, in frame 8, the sixth derivative is −25. In this case, the OS Ratio may be 3200−(OS Ratio)=3200−−25=3225. In this case, the period of modulated PWM signal 610 is 3225. For the ninth frame, the sixth derivative is zero and the period is 3200. However, for the tenth frame, the sixth derivative is −5 and the period is 3200−−5=3205. For the eleventh frame, the sixth order derivative is +41, and the period is 3200−41=3159. This process continues as the sixth derivative is used to adjust the period of the switching frequency for modulated PWM signal 610. As shown in FIG. 6, the first rising edge of modulated PWM signal 610 is varied within each frame.

A min-margin pulse is added by min margin pulse insertion block 512 and the output of min margin pulse insertion block 512 is shown as min pulse 612. This adds minimum and margin pulses to modulated PWM signal 610.

FIG. 7 shows a table of results that are used to determine which Nth derivative to use in the modulation according to one embodiment. A first row (No SS (Spread Spectrum)) shows performance results in a fixed frequency scenario, that is, without any modulation. Each successive row (SS using Nth derivative) shows performance results with modulation using an Nth derivative of the input signal. A column 702 shows the signal-to-noise ratio; a column 704 shows A-weighted signal to noise ratio; a column 706 shows the total harmonic distortion+noise; and a column 708 shows a-weighted total harmonic distortion plus noise. A column 710 shows a peak FCC band1 tone level and a column 712 shows a peak FCC band2 tone level. A column 714 and a column 716 show attenuation in FCC band1 and FCC band2 as compared to the no SS scenario, respectively. The attenuation in FCC band1 and band2 is calculated as:

[peak FCC band1 with no SS]–[peak FCC band1 with SS using Nth derivative] and

[peak FCC band2 with no SS]–[peak FCC band2 with SS using Nth derivative].

In a column 718, the degradation of signal-to-noise ratio as compared to the no SS scenario is shown. The degradation may be calculated as:

[SNR with no SS]–[SNR with SS using Nth derivative].

In a column 720, the degradation of THD+N is shown. Degradation in THD+N may be calculated as:

[THD+N with SS using Nth derivative]–[THD+N with no SS].

Using the selection criteria above, the optimal Nth derivative for EMI reduction is determined as n=6. Although n=6 is used, it will be understood that other Nth derivatives may be used.

The following describes the characteristics in the fixed frequency mode and the EMI reduction using the sixth order signal derivative:

Fixed-frequency mode i.e. without EMI—

| | |
|---|---|
| SNR | 121.9556 dB |
| THD + N | –116.2588 dB (0.00015%) |
| Min attenuation in FCC band1 30 MHz-300 MHz | 41.517 dB |
| Min attenuation in FCC band2 300 MHz-1 GHz | 54.426 dB |

In EMI reduction scheme with $6^{th}$ order signal derivative—

| | |
|---|---|
| SNR | 120.869 dB |
| THD + N | –115.589 dB (0.00017%) |
| Min attenuation in FCC band1 30 MHz-300 MHz | 61.701 dB |
| Min attenuation in FCC band2 300 MHz-1 GHz | 77.922 dB |

More than 20.184 dB of tone suppression in FCC band1 and 23.496 dB of tone suppression in FCC band2 is achieved. The degradation of in-band SNR is 1.087 dB and the degradation of THD+N is 0.67 dB. Also, the tones that exist using the EMI reduction are tones near 30 MHz at –61 dB, tones near 300 MHz are at –79 dB, and tones at 1 GHz are at –89 dB.

Figure 8:
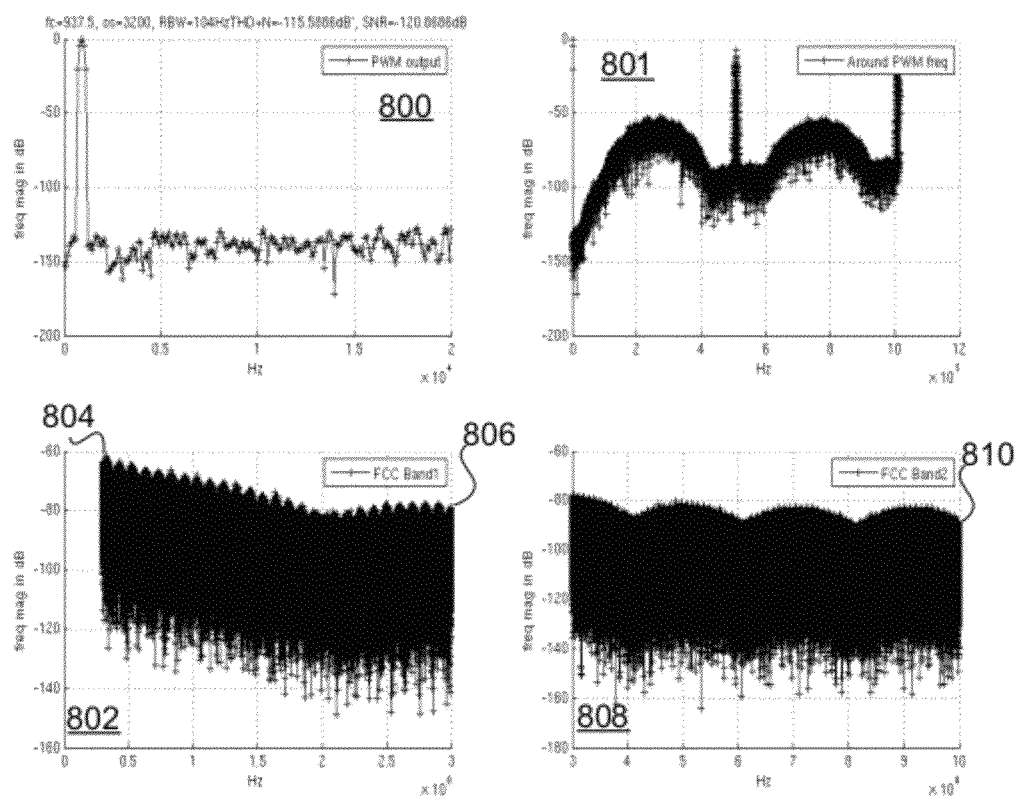
FIG. 8 shows an example of graphs of tones using the EMI reduction according to one embodiment.

FIG. 8 shows an example of graphs of tones using the EMI reduction according to one embodiment. Graphs 800 and 801 show the tones around the PWM output and around the PWM frequency. In a graph 802, tones around 30 MHz are around –61 dB as shown at 804. The –61 dB tone is compared to a –41.5 tone in the conventional fixed frequency case. At 806, tones around 300 MHz are around –79 dB. The –79 dB tone is compared to a –54.4 tone in the conventional fixed frequency case. In a graph 808, tones around 1 GHz are around –89 dB as shown at 810. The –89 dB tone is compared to a –65 tone in the conventional fixed frequency case.

Figure 9:
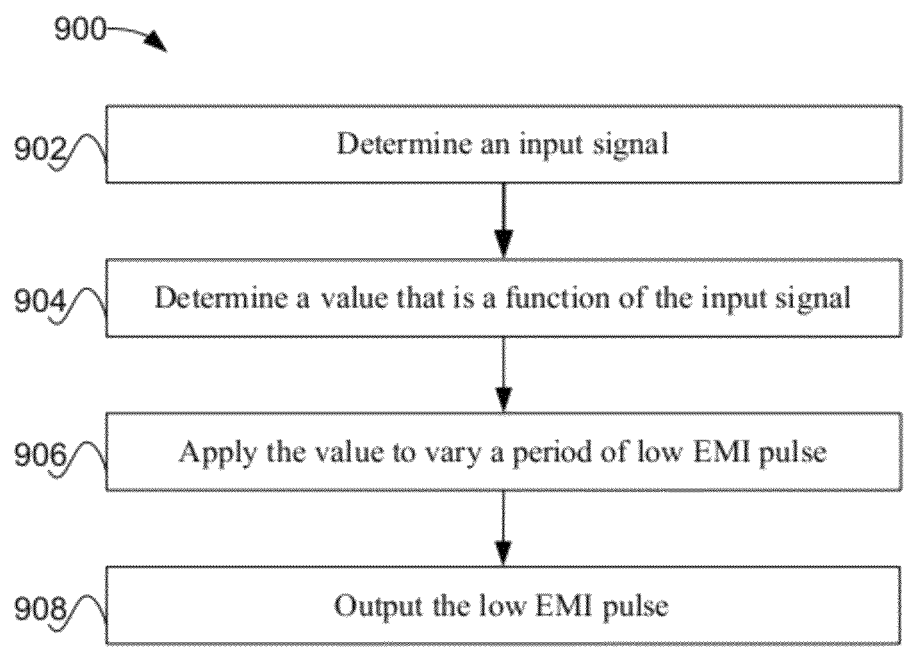
FIG. 9 depicts a method for performing EMI reduction according to one embodiment.

FIG. 9 depicts a method for performing EMI reduction according to one embodiment. At 902, an input signal is determined. The input signal may be fixed or variable frequency PWM signal 606, which is determined based on an audio signal 604.

At 904, a value that is a function of the input signal is determined. The value is used to modulate modulated PWM signal 610. For example, an Nth derivative of the input signal may be used to determine the value.

At 906, the value is applied to vary a period of modulated PWM signal 610. For example, the Nth derivative is used to vary the period of modulated PWM signal 610.

At 908, modulated PWM signal 610 is output. Modulated PWM signal 610 is used as an input to a class-D audio amplifier. As described above, by modulating the period of modulated PWM signal 610, electro-magnetic interference in tones in the modulation signal are reduced.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
    receiving a pulse width modulation signal having a fixed frequency;
    determining a first-order derivative based on a difference between two values at two consecutive indexes of the pulse width modulation signal having the fixed frequency;
    determining an Nth-order derivative based on another difference between two values at the two consecutive indexes of an (N–1)th-order derivative, wherein N is greater than one;
    determining a value that is based on the Nth-order derivative of the pulse width modulation signal; and
    applying the value to modulate a switching frequency of the pulse width modulation signal to generate a modulated pulse width modulation signal, wherein the applied value reduces electro-magnetic interference from tones in the modulated pulse width modulation signal.

2. The method of claim 1, wherein at least some pulses of the pulse width modulation signal have different duty cycles than corresponding pulses of the modulated pulse width modulation signal.

3. The method of claim 1, wherein the Nth-order derivative is a $6^{th}$ derivative of the pulse width modulation signal.

4. The method of claim 1, wherein the two consecutive indexes correspond to a current frame of a pulse in the pulse width modulation signal and a previous frame of the pulse in the pulse width modulation signal.

5. The method of claim 1, wherein the pulse width modulation signal is determined based on an input signal.

6. The method of claim 1, wherein the Nth-order derivative is an Nth difference across a set of (N+1) adjacent pulses of the pulse width modulation signal.

7. The method of claim 1, wherein the pulse width modulation signal is determined based on a crossing point of an input signal and a waveform.

8. The method of claim 1, wherein a frequency of the pulse width modulation signal is a ratio that is based on a number of phase lock loop (PLL) cycles in each pulse width modulation clock cycle.

9. The method of claim 8, wherein the ratio for the modulated pulse width modulation signal is varied to modulate a frequency for the modulated pulse width modulation signal.

10. The method of claim 1, further comprising:
    calculating a plurality of Nth-order derivatives of the pulse width modulation signal, where N=2, . . . , n; and
    selecting one of the Nth-order derivatives based on a criterion.

11. The method of claim 1, wherein the modulated pulse width modulation signal is input into an audio amplifier.

12. An apparatus comprising:
    circuitry configured to receive a pulse width modulation signal having a fixed frequency;
    circuitry configured to determine a first-order derivative based on a difference between two values at two consecutive indexes of the pulse width modulation signal having the fixed frequency;
    circuitry configured to determine an Nth-order derivative based on another difference between two values at the two consecutive indexes of an (N−1)th-order derivative, wherein N is greater than one;
    circuitry configured to determine a value that is based on the Nth-order derivative of the pulse width modulation signal; and
    circuitry configured to apply the value to modulate a switching frequency of the pulse width modulation signal to generate a modulated pulse width modulation signal, wherein the applied value reduces electro-magnetic interference from tones in the modulated pulse width modulation signal.

13. The apparatus of claim 12, wherein at least some pulses of the pulse width modulation signal have different duty cycles than corresponding pulses of the modulated pulse width modulation signal.

14. The apparatus of claim 12, wherein the Nth-order derivative is a $6^{th}$ derivative of the pulse width modulation signal.

15. The apparatus of claim 12, wherein a frequency of the pulse width modulation signal is a ratio that is based on a number of phase lock loop (PLL) cycles in each pulse width modulation clock cycle.

16. The apparatus of claim 12, wherein the pulse width modulation signal is determined based on an input signal.

17. The apparatus of claim 12, wherein the Nth-order derivative is an Nth difference across a set of (N+1) adjacent pulses of the pulse width modulation signal.

18. The apparatus of claim 16, wherein an audio amplifier comprises a class-D amplifier.

19. A system comprising the apparatus of claim 12, the system further comprising:
    a pulse width modulation (PWM) generation block comprising logic configured to:
        receive an input signal;
        determine crossing points of the input signal to a waveform; and
        output the pulse width modulation signal based on the crossing points.

20. The system of claim 19, further comprising:
    a class-D amplifier configured to receive the modulated pulse width modulation signal and amplify the modulated pulse width modulation signal; and
    a load configured to receive the modulated pulse width modulation signal from the class-D amplifier.

* * * * *